United States Patent [19]

His et al.

[11] Patent Number: 5,405,227

[45] Date of Patent: Apr. 11, 1995

[54] FASTENERS MADE OF COMPOSITE MATERIAL OF A CERAMIC MATRIX REINFORCED WITH REFRACTORY FIBERS

[75] Inventors: Sylvie His, Bruges; Jean-Michel Lequertier, Saint Aubin de Medoc, both of France

[73] Assignee: Societe Nationale Industrielle et Aerospatiale, Paris Cedex, France

[21] Appl. No.: 76,430

[22] Filed: Jun. 14, 1993

[30] Foreign Application Priority Data

Jun. 17, 1992 [FR] France ................................ 92 07684

[51] Int. Cl.⁶ ........................ F16B 35/00; F16B 35/04
[52] U.S. Cl. .................... 411/366; 411/424; 411/427; 411/908
[58] Field of Search ............... 411/366, 411, 424, 427, 411/537, 908

[56] References Cited

U.S. PATENT DOCUMENTS

| 4,440,534 | 4/1984 | LeBate ............................ 411/427 X |
| 4,887,518 | 12/1989 | Hayakawa . | |
| 5,033,925 | 7/1991 | Moghe ................................ 411/366 |
| 5,127,783 | 7/1992 | Moghe et al. . | |

FOREIGN PATENT DOCUMENTS

| 0399548 | 11/1980 | European Pat. Off. . | |
| 1193489 | 4/1959 | France ................................ 411/537 |
| 2586246 | 2/1987 | France . | |
| 2610921 | 8/1988 | France . | |

OTHER PUBLICATIONS

NTIS Tech Notes, "Braided Composite Threaded Fastener", vol. M, No. 2301, Feb. 1991, p. 195.

*Primary Examiner*—Neill R. Wilson
*Attorney, Agent, or Firm*—Sandler, Greenblum & Bernstein

[57] ABSTRACT

Fasteners composed of a composite material constituted by a ceramic matrix reinforced with refractory fibers for use in the assembling and dissembling of structures likely to be subjected to high temperatures. The fasteners, which can comprise screws, nuts and bolts, can include a threaded rod, possibly comprising a head, and at least one nut cooperating with the rod. The threads of the rod and the nut are round threads. Further, the male and female portions of the threads have the same theoretical profile to within machining tolerance and functional clearance.

19 Claims, 2 Drawing Sheets

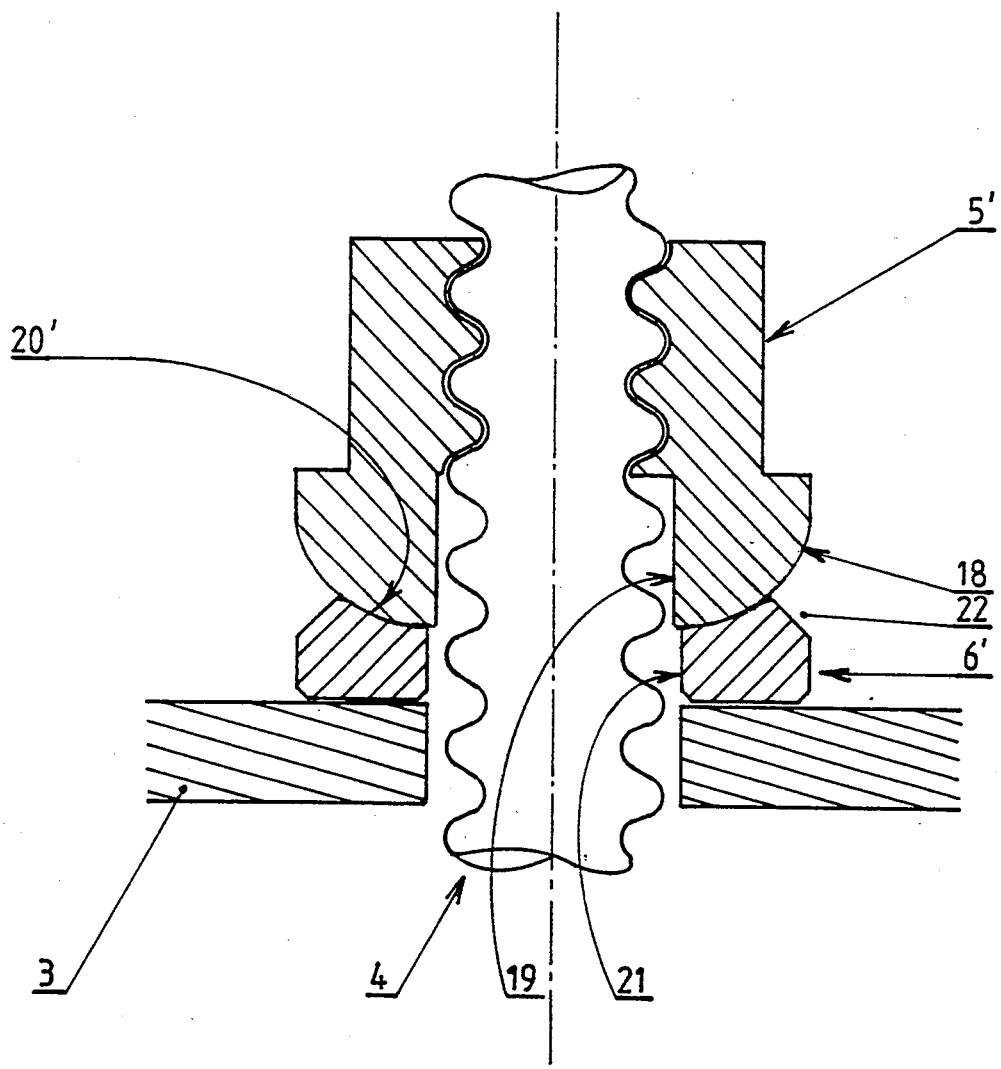
FIG_6

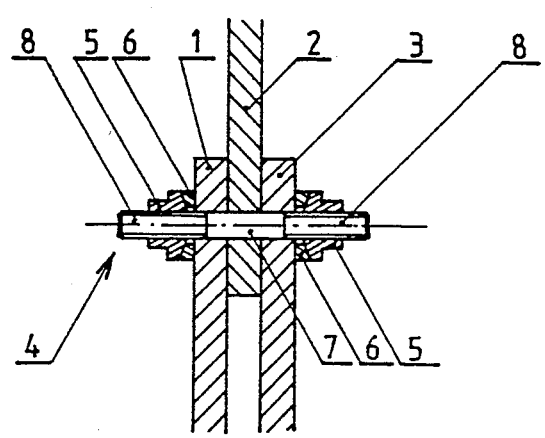
FIG_1_
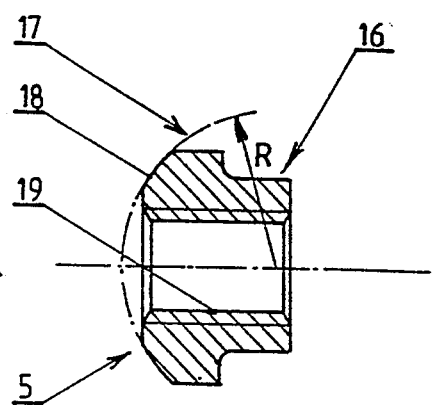
FIG_3_
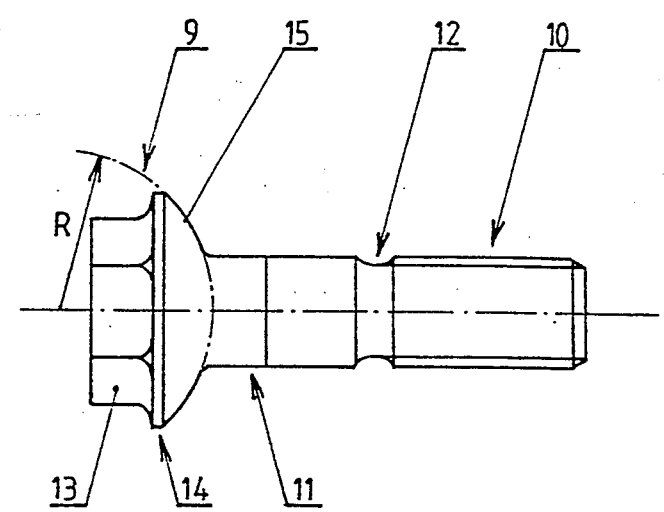
FIG_2_
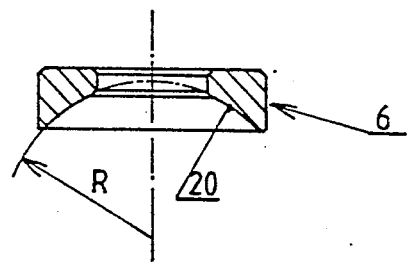
FIG_4_
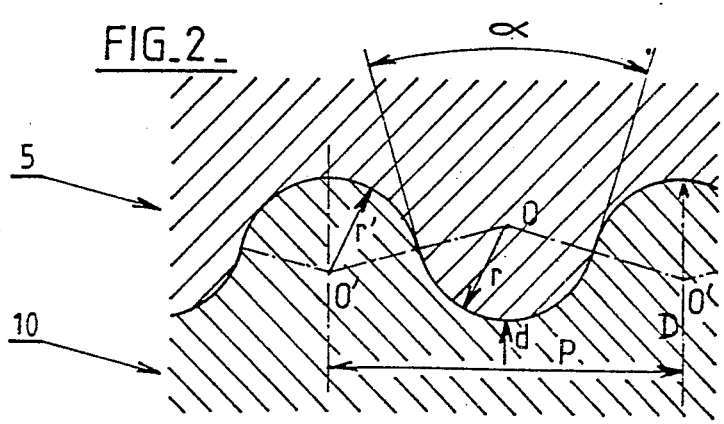
FIG_5_

FASTENERS MADE OF COMPOSITE MATERIAL OF A CERAMIC MATRIX REINFORCED WITH REFRACTORY FIBERS

BACKGROUND OF THE INVENTION

1. Field of the Invention

The present invention concerns screws, nuts and bolts made of a composite material comprising a ceramic matrix reinforced with refractory fibers, and more specifically, assembling members or fasteners comprising firstly a threaded rod possibly including a head, and secondly at least one nut cooperating with the rod, the members being made of a ceramic material obtained by sintering, under the load of a refractory powder, and incorporating reinforcement filaments in the form of trichite or "whiskers".

2. Background Information

The construction of the invention more particularly, although not exclusively, uses composite materials with a ceramic matrix constituted by SiAlON or $Si_3N_4$, and reinforced with silicon carbide and/or silicon nitride trichites. These materials are respectively described in the French patent No 2.586.246 and 2,610.921.

The reinforced ceramic materials have the following advantageous characteristics:
  almost isotropic reinforcement,
  natural resistance to oxidation,
  ability to be used at temperatures that reach or exceed 1200° C.,
  good thermomechanical properties,
  good tenacity and good resistance to thermal shocks,
  good machinability as compared with other ceramic materials.

Because of their specific properties, especially the hardness and resistance to thermal and mechanical shocks, these materials are mainly used in hot tribology and are rarely exploited for structural uses owing to their elastic characteristics, wherein the materials are considerably rigid and fragile.

Recently, there has been considerable interest in constructing structures that can be assembled and disassembled and are also able to resist high temperatures reaching or even exceeding 1200° C.

With this aim in mind, it is out of the question to consider making use of metallic screws, nuts and bolts, because they are unable to withstand such high temperatures. However, the ceramic composite materials, of the type described above, have properties and special characteristics that make the simple reproduction of metallic screws, nuts and bolts into reinforced ceramic screws, nuts and bolts for use in assembling structures subjected to high mechanical traction, bending and shearing stresses unsatisfactory. Added to this is the difficulty of machining and the fragility of the reinforced ceramic materials, especially as regards tensile strength. This makes it impossible to obtain acceptable resistance to rupture in light of the mechanical stress that the screws, nuts and bolts will confront.

SUMMARY OF THE INVENTION

The object of the present invention is to embody screws, nuts and bolts made of a reinforced ceramic material able to withstand mechanical stresses in temperature conditions possibly reaching or exceeding 1200° C.

To this end, the invention concerns screws, nuts and bolts made of a composite material constituted by a ceramic matrix reinforced with refractory fibers, and including firstly a threaded rod possibly comprising a head, and secondly one or several nuts cooperating with the rod, wherein the threads of the rod and the nuts are round threads. More specifically, with regard to the threads, the male and female portions having the same theoretical profile to within machining tolerance and functional clearance.

These screws, nuts and bolts preferably also satisfy the following condition:

$$0.03 \leq r/D \leq 0.07,$$

in which r is the radius of the root of the thread and the radius of the crest of the thread and D is the external diameter of the threaded rod.

The rod threads preferably have an angle $\alpha$ of between 30 and 100 degrees.

This threaded profile proves to be remarkably adapted to the nature of the reinforced ceramic materials described above because the assembling members fabricated from these materials have excellent tensile strength, able to exceed 200 MPa. This is especially the situation when using a $SiC_W$/SiAlYON type reinforced ceramic as a material.

Similarly, shearing tests on these materials have demonstrated a resistance to rupture exceeding 160 MPa.

These screws, nuts and bolts are intended in particular for the assembling of plates, especially carbon—carbon plates, whether or not protected against oxidation. Generally speaking, the screws, nuts and bolts of the invention shall be used in conjunction with spacers that fit between firstly the head and/or the nut(s), and secondly the set of plates to be assembled. The spacers have a spherical bearing surface and are included to provide mechanical strength by eliminating harmful parasitic bendings and also to provide reliability of the assembling.

As regards the nuts, this is obtained by rendering one of the faces of the nut spherical and by inserting between the set of plates and the spherical surface of the nut an intermediate piece, such as a washer having a spherical surface complementary to that of the nut.

As regards the threaded rod, when this concerns a screw, the internal face of the head around the core is rendered spherical to correspond with a spherical countersinking embodied on the opposing plate at the level of the bore receiving the screw.

BRIEF DESCRIPTION OF THE DRAWINGS

Other characteristics and advantages shall appear more readily from a reading of the following description of embodiments of screws, nuts and bolts according to the invention and with reference to the accompanying drawings in which:

FIG. 1 diagrammatically represents a mode for assembling plates, such as carbon—carbon plates possibly protected against oxidation, with the aid of a nut and bolt system according to the invention, FIG. 2 shows a screw according to the invention, FIG. 3 shows an axial cutaway view of a nut according to the invention, FIG. 4 shows an axial cutaway view of a washer with a concave spherical surface able to be associated with the screw of FIG. 2 or the nut of FIG. 3, FIG. 5 is an axial cutaway view of a screw/nut assembly according to the invention, and FIG. 6 illustrates an axial cutaway view of one embodiment variant of a washer/nut assembly according to the invention in a mounted position.

DETAILED DESCRIPTION OF THE INVENTION

FIG. 1 respectively shows at 1,2 and 3 three plates, such as carbon—carbon plates, stacked and kept assembled with the aid of a bolt 4 traversing bores embodied in the plates which are pressed against one another by two nuts 5, and a washer 6 being inserted between each nut and the face opposite the plates in question.

The bolt 4 comprises a central smooth portion 7 and two threaded extremity portions 8.

FIG. 2 shows another set of screw type screws and bolts formed of a rod provided with a head 9, a threaded portion 10 at the extremity opposing the head, and a central smooth barrel 11 separated from the threaded portion 10 by an annular undercut 12.

The head 9 comprising a hexagonal-shaped external portion 13 and one portion 14 for connecting it to the central barrel 11 having one face 15 orientated towards the center of the convex spherical-shaped screw with a bending radius R encompassing the central barrel 11.

FIG. 3 shows in more detail a nut 5 including one hexagonal-shaped portion 16 and one cylindrical portion 17 whose extremity face 18 has a convex spherical shape with a bending radius R. The nut 5 comprises an inside or female thread 19.

FIG. 4 shows in more details a washer 6 having one of its faces 20 having a convex spherical shape with a bending radius R.

The pieces 5, 6 and 7 and the screw of FIG. 2 are each made in one piece of a reinforced ceramic material obtained a process with loading of a refractory powder incorporating reinforcement filaments in the form of trichites or "whiskers".

More particularly although not exclusively, the invention can incorporate $SiC_W/SiAlON$ and $SiC_W/Si_3N_4$ type materials described respectively in the French patents No 2.586.246 and 2.610.921.

These materials, and reinforced ceramic composite materials in general, are extremely rigid and fragile. They are mainly suitable for working effectively in compression., In comparison, tensile loads generate a significant risk of causing an incipient fracture either opposite a surface irregularity, this type of defect mainly originating during machining, or opposite an internal flaw, this type of defect being derived from mixture differences or parasitic inclusions.

So as to mitigate these drawbacks and thus obtain screws, nuts and bolts suitable for assembling and disassembling structures, able to withstand high temperature possibly reaching and exceeding 1200° C., and able to withstand high mechanical stresses, the invention proposes using the composite materials of the type mentionned above in order to embody entirely specific screws, nuts and bolts or fasteners which are notable for their nature and the special features of their threadings.

In particular, the threadings of the assembling members of the invention, such as those shown on FIGS. 1–3, male (8,10) as well as female (19), are threadings of the type with round threads whose principle is already known per se.

The round threads are mainly used in wooden screws and bolts, and relatively less in metallic screws and bolts, where they are used more particularly to constitute linkings between pieces subjected to shocks and not to embody a static assembly.

FIG. 5 shows the type of round threads used in accordance with the invention.

This figure shows the male and female threads of the threaded 10 and a nut 5 respectively and have the same theoretic profile and occupy the entire space between the rod and the nut. In this respect, the radius of the root of thread r and the radius of the crest of thread r' are almost identical, with the difference arising from machining conditions and the need for a minimal functional clearance between the rod and the nut for moving the nut along the rod.

The round thread referred to above is characterized by its pitch P, radii r, r', and angle $\alpha$. With regard to angle $\alpha$, it is determined by the tangent lines to the points of intersection of the flanks of the threads and the straight lines joining the centers 0,0' of the radii r,r' of the male and female threads. In addition, d denotes the diameter, at the root of thread, of the threaded rod (10) and D denotes the external diameter of said rod.

As result of researches, tests and calculations, it has been shown that round type threads are entirely suitable for the reinforced ceramic materials in question for three basic reasons.

First of all, the round threads all fully observe the tensile fragility of the materials as they convert most of the tensile loads exerted on the screw or bolt of the assembly into compression loads on the material of the threads.

Secondly, the round threads with their soft forms are suitable to a machining which—and this is a determining factor for the reinforced ceramic materials—avoid any incipient fracture prejudicial to tensile strength.

Thirdly, the round threads provide the threaded rod, whether this concerns a bolt (FIG. 1, #4) or a screw (FIG. 2), with a remarkably low local tensile overstress coefficient. This property makes it possible to much more effectively dimension the rod and in particular reduce the working section of the screw and thus optimize the mass for a given rupture strength.

As a matter of fact, the local overstress coefficient, or theoretical stress concentration factor known as $K_t$, is defined as the ratio of the maximum real notch root stress to the maximum nominal stress in the net section of the notched piece. This parameter $K_t$, to the extent that the piece is constituted of a homogeneous and continuous material, is solely depends on the geometry of the piece and the type of stressing.

A piece made of a material having one plastic zone, which can possibly be the case with metals, is able to accept relatively significant local overstresses at a level less than the breaking stress and even theoretically at a level greater than the breaking stress, especially in a static state. This piece, when reaching its elastic limit, will locally deform at the plastic zone and adapt itself.

For a material, such as ceramic material that is extremely rigid, this phenomenon of adaptation does not exist as the material does not have any plastic zone.

Consequently, the local overstressing becomes dimensioning and may generate a rupture.

The inventors have thus shown that provision of a round thread type, threading onto a single unit piece made of a reinforced ceramic material, provides the assembling pieces with a remakably low coefficient $K_t$. Moreover, this assembly this able to significantly improve adaptation of the working section of the threaded rods (screw or bolt), according to the dimensional and weight loads, and any mechanical and thermal loads to be confronted.

By way of example, there now follows a table of the parameters (determined by calculation and on the basis of initial data) of a threaded rod embodied in accordance with the invention with a thread of the type shown on FIG. 5 and for a material formed of $SiC_W$/SiAlYON.

| | |
|---|---|
| D (mm) | 7.00 |
| d (mm) | 5.854 |
| α | 30° |
| r (mm) | 0.378 |
| P (mm) | 1.502 |
| $S = \pi d^2/4$ (mm$^2$) | 26.92 |
| r/D | 0.054 |
| d/D | 0.836 |
| Theoretical $K_{tt}$ | <2.7 |
| $K_{ts}$ | <1.27 |
| $St/K_{tt}$ | >9.97 |
| $F_t$ | >321 daN |

In the table, S is the working section, $K_{tt}$ and $K_{ts}$ are respectively the tensile and torsion stress concentration coefficients and $F_t$ represents an estimate of the tensile strength load on the basis of a breaking stress $\sigma_t = 320$ MPa.

Tests carried out on the basis of the dimensional parameters of the above table showed, in fact, that the threaded embodiment had an effective tensile rupture strength, $F_t$, ranging within 400 and 500 daN. This $F_t$ is clearly greater than the estimated bottom value of 321 stated in the table.

Shearing tests also showed a resistance to rupture exceeding 2500 daN.

Also, it ought to be mentioned that the measurement of the static friction coefficient, flank per flank, for the $SiC_W$/SiAlYON material gave values of between 0.22 and 0.26 according to the load applied, which eliminates the risk of obtaining unscrewing fasteners.

Further, the $SiC_W$/SiAlYON material resists a temperature of about 1200° C. In this regard, by way of comparison, the $SiC_W/Si_3N_4$ material withstands a temperature able to reach 1400° C. and more particularly possesses a tensile strength exceeding that of the $SiC_W$/SiAlYON material.

The screws and bolts of the invention further preferably satisfy the following condition:

$$0.03 \leq r/D \leq 0.07$$

in which r represents both the radius of the root of thread and the radius of the crest of thread and D is the external diameter of the threaded rod.

Such a condition makes it possible to obtain a satisfactory coefficient $K_t$ of less than 3.5.

For value of the ratio r/D exceeding 0.07, indeed even smaller values of $K_t$ are obtained but corresponding to values of the thread root diameter d of the threaded rod, too small and unusable. On the other hand, for values of the ratio r/D of less than 0.03, excessive values of $K_t$ are obtained.

Furthermore, the angle α is preferably situated within a range of between 30 and 100 degrees, it being understood that the bigger the angle α is, the better shall be the tensile strength of the threaded rod.

Generally speaking, the screws, nuts and bolts of the invention shall be constructed to provide a particular contact between the nuts 5 and the washers 6, or between the screw head 14 and the opposing plate to be assembled. Specifically, this contact is in the form of spherical bearing surfaces with a suitable bending radius so as to eliminate any possible harmful parasitic bendings, for reasons of mechanical strength and reliability of mounting.

With respect to the nut/washer interaction, it appeared during tests that a risk of rupture via a separation of the nut could exist opposite the spherical bearing surface owing to the fact that the contact may only be obtained on a small annular surface because of the extreme stiffness of the material and the impossibility of having a perfect machining. In order to resolve this problem, it is possible to reduce the surface of the spherical bearing surfaces and move it towards the center of the nut and washer.

In addition, so as to further improve resistance to rupture, it is possible to suppress in the nut those threads closest to the spherical bearing surface.

FIG. 6 shows an embodiment of a nut/washer assembly comprising the dispositions referred to above.

On the side of its spherical convex surface 18, the nut 5' is provided with a cylindrical recess 19 coaxial to the threads and thus eliminating two or three of the threads closest to said surface 18.

The central recess 21 of the washer 6' may be adjusted to the diameter of said recess 19.

Finally, the spherical concave surface 20' of the washer 6' is significantly reduced by accordingly chamfering the outer edge orientated towards the nut of the washer 6'.

Finally, the invention is not merely limited to the embodiments described above but on the contrary, covers all alternative embodiment, especially as regards the nature of the reinforced ceramic material, as well as the dimensional characteristics of the threadings and the spherical bearing surfaces within the possible limits defined earlier. The spherical bearing surfaces may of course by inverted, the spherical surfaces of the nuts being, for example, concave and those of the associated washers convex.

We claim:

1. Threaded fasteners, comprising:
   at least one first element comprising at least one male portion, said at least one first element being composed of a composite material comprising a refractory fiber reinforced ceramic matrix;
   at least one second element comprising at least one female portion, said at least one second element being composed of a composite material comprising a refractory fiber reinforced ceramic matrix; and
   each of said at least one male portion and said at least one female portion including a threaded portion comprising round threads, and said threaded portion of said at least one male portion and said threaded portion of said at least one female portion comprise substantially the same profile within machining tolerance and functional clearance.

2. Threaded fasteners, comprising:
   at least one first element comprising at least one male portion, said at least one first element being composed of a composite material comprising a refractory fiber reinforced ceramic matrix;
   at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance; and said round threads have a root radius and a crest radius, and said at least one male portion has an external diameter; and $$0.03 \leq r/D \leq 0.07$$

wherein r represents the radius of the root of said round thread or the radius of the crest of said round thread, and D represents the external diameter.

3. Fasteners according to claim 2, wherein said composite material comprises at least one ceramic matrix selected from the group consisting of SiAlON or Si-AlYON and $Si_3N_4$ reinforced with at least one member selected from the group consisting of silicon carbide and silicon nitride trichites.

4. Threaded fasteners, comprising:
at least one first element comprising at least one male portion, said at least one first element being composed of a composite material comprising a refractory fiber reinforced ceramic matrix;

at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance; and wherein:

$$30° \leq \alpha \leq 100°$$

wherein α represents an angle determined by tangent lines to points of intersection of flanks of said round threads and straight lines joining centers of curvature of the round threads of said at least one male portion and said at least one female portion.

5. Fasteners according to claim 4, wherein said composite material comprises at least one ceramic matrix selected from the group consisting of SiAlON or Si-AlYON and $Si_3N_4$ reinforced with at least one member selected from the group consisting of silicon carbide and silicon nitride trichites.

6. Fasteners according to claim 2, wherein:

$$30° \leq \alpha \leq 100°$$

wherein α represents an angle determined by tangent lines to points of intersection of flanks of said round threads and straight lines joining centers of curvature of the round threads of said at least one male portion and said at least one female portion.

7. Threaded fasteners, comprising:
at least one first element comprising at least one male portion, said at least one first element being composed of a composite material comprising a refractory fiber reinforced ceramic matrix;

at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance; and said at least one second element comprises at least one nut comprising a spherical bearing surface.

8. Fasteners according to claim 7, wherein said at least one nut comprises extremities, and a portion of said at least one female member adjacent an extremity of said at least one nut is non-threaded.

9. Fasteners according to claim 1, wherein said at least one first element comprises a threaded rod.

10. Fasteners according to claim 9, wherein said threaded rod comprises a head.

11. Threaded fasteners, comprising:
at least one first element comprising at least one male portion, said at least one first element being composed of a composite material comprising a refractory fiber reinforced ceramic matrix;

at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance;

said at least one first element comprises a threaded rod; and said at least one second element comprises at least one nut comprising a spherical bearing surface.

12. Fasteners according to claim 11, further including at least one intermediate element comprising a spherical bearing surface, and said spherical bearing surface of said at least one second element cooperates with said spherical bearing surface of said at least one intermediate element.

13. Fasteners according to claim 12, wherein said at least one intermediate element comprises a washer.

14. Fasteners according to claim 13, wherein said at least one second member element comprises a nut.

15. Fasteners according to claim 14, wherein said nut and washer comprise a nut/washer assembly having an axis, and the spherical surfaces of said nut and washer are dimensioned to be close to said axis.

16. Threaded fasteners, comprising:
at least one first element comprising at least one male portion, said at least one first element being composed of a composite material comprising a refractory fiber reinforced ceramic matrix;.

at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance;

said at least one first element comprises a threaded rod comprising a head; and said threaded rod comprises a screw, and said head comprises a barrel side including a spherical bearing surface.

17. Fasteners according to claim 16, further including at least one intermediate element comprising a spherical bearing surface, and said spherical bearing surface of said head cooperates with said spherical bearing surface of said at least one intermediate element.

18. Threaded fasteners, comprising:

at least one first element comprising at least one male portion, said at least one first element being composed of a composite material comprising a refractory fiber reinforced ceramic matrix;

at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance;

said at least one first element comprises a threaded rod comprising a head; and said spherical bearing surface of said head is capable of cooperating with a spherical bearing surface in a surface of an element to be assembled.

19. Threaded fasteners, comprising:

at least one first element comprising at least one male portion, said at least one first element being composed of a composite material comprising a refractory fiber reinforced ceramic matrix;

at least one second element comprising at least one female portion, said at least one second element being composed of a composite material comprising a refractory fiber reinforced ceramic matrix; and each of said at least one male portion and said at least one female portion including a threaded portion comprising round threads, and said threaded portion of said at least one male portion and said threaded portion of said at least one female portion comprise substantially the same profile within machining tolerance and functional clearance; and said composite material comprises at least one ceramic matrix selected from the group consisting of SiAlON or SiAlYON and $Si_3N_4$ reinforced with at least one member selected from the group consisting of silicon carbide and silicon nitride trichites.

* * * * *

UNITED STATES PATENT AND TRADEMARK OFFICE
CERTIFICATE OF CORRECTION

PATENT NO. : 5,405,227
DATED : April 11, 1995
INVENTOR(S) : Silvie HIS et al.

It is certified that error appears in the above-indentified patent and that said Letters Patent is hereby corrected as shown below:

On the cover page, at item [73], viz., "Assignee:", the assignee should be listed as follows:

---Societe Anonyme dite Aerospatiale Societe Nationale Industrielle---.

Signed and Sealed this

Fifteenth Day of July, 1997

*Attest:*

BRUCE LEHMAN

*Attesting Officer*     *Commissioner of Patents and Trademarks*